No. 881,330. PATENTED MAR. 10, 1908.
W. J. NEWMAN.
DIGGING SHOVEL.
APPLICATION FILED JAN. 25, 1907.

Witnesses:
A. W. Finstemaker
C. H. Crawford

Inventor,
William J. Newman
By
Glenn S. Noble
Att'y.

UNITED STATES PATENT OFFICE.

WILLIAM J. NEWMAN, OF CHICAGO, ILLINOIS.

DIGGING-SHOVEL.

No. 881,330.　　　Specification of Letters Patent.　　　Patented March 10, 1908.

Application filed January 25, 1907. Serial No. 354,084.

*To all whom it may concern:*

Be it known that I, WILLIAM J. NEWMAN, a citizen of the United States, residing at Chicago, in the county of Cook and State of Illinois, have invented certain new and useful Improvements in Digging-Shovels, of which the following is a specification.

In excavating trenches or other deep excavations by means of a digging shovel operated from a boom, I have found that it is desirable to have the shovel so arranged that it will be guided, as by means of suitable guide-shoes, and furthermore, so that a considerable amount of adjustment may be provided for such guide means and for the supports therefor which may also act as arms for dragging the shovel.

The present invention relates to such an apparatus, and its objects are to provide a practical and efficient device for deep digging and one which may be readily adjusted for different positions or for different kinds of earth.

I have shown this invention in the accompanying drawings in which

Figure 1:
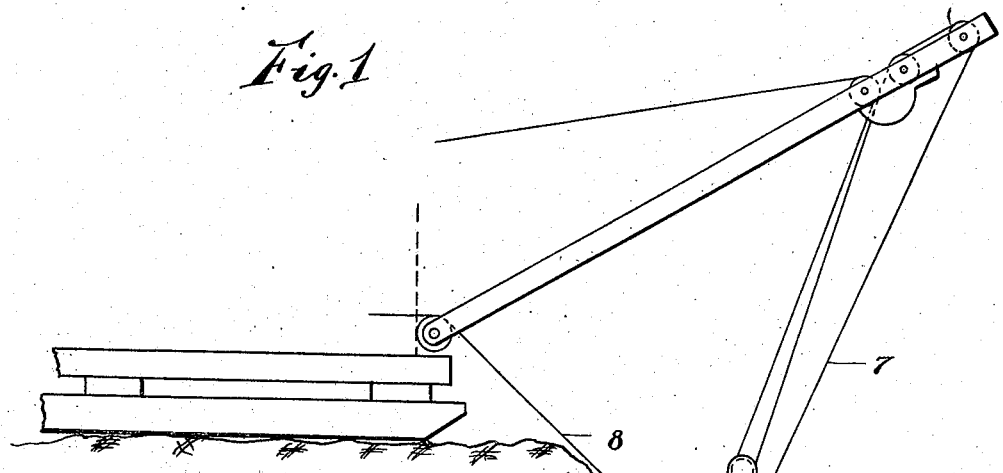
Figure 2:
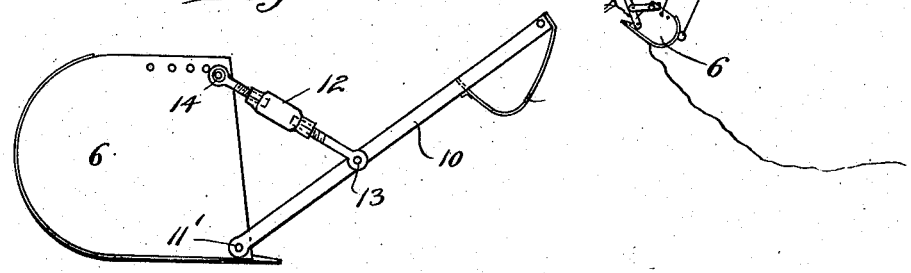
Figure 3:
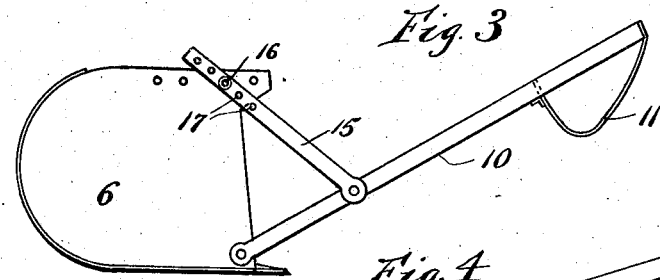
Figure 4:
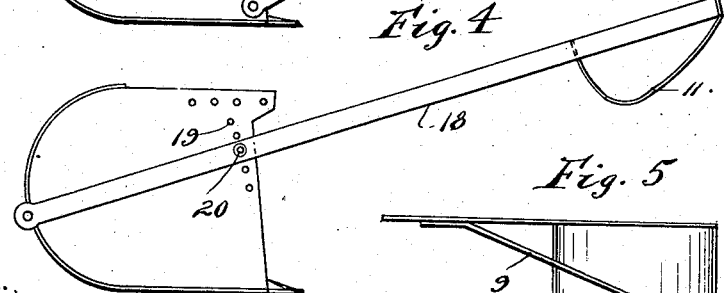
Figure 5:
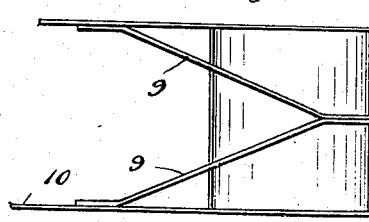

Figure 1 is a diagrammatic view showing the position of the skids or supports for the operating boom together with my improved shovel shown in digging position; Fig. 2 is a side view showing one form of my improved shovel; Figs. 3 and 4 show modified forms of the same; and Fig. 5 is a top-plan view showing the drag-arms with the guide secured thereto.

As shown in the drawings, 6 represents a suitable digging shovel which is preferably raised and discharged by means of a single line 7 according to my invention shown and claimed in my pending application, Serial No. 332,208, filed August 27, 1906. The shovel is filled by means of a suitable drag-line 8 which is preferably attached to braces 9 which connect between the side-arms 10, as shown in Fig. 5. At the forward end of these arms is a guide-shoe 11 which is preferably formed of sheet steel, and extends across between said arms. As shown in Fig. 2, the arms 10 are pivoted at 11' to the bucket 6, at a point adjacent to the cutting edge. In order to adjust the arms 10, while at the same time connecting them rigidly with the bucket 6, I have provided turn-buckles 12, the ends of which are pivoted at 13 to the arms 10 and at 14 to the upper forward sides of the bucket 6.

It will be readily seen that by adjusting the turn-buckles 13, the arms 10 may be given any desired pitch in reference to the cutting edge of the bucket, and by means of such adjustment the device can be readily arranged for digging up steep slopes as indicated in Fig. 1. At the same time, the guide-shoe always acts to properly regulate the cutting depth of the shovel.

As shown in Fig. 3, the arms 10 may be adjusted by means of bars 15 which are pivoted thereto at 16 and extend up adjacent to the upper forward corners of the bucket where they are attached by means of suitable bolts 16. By means of a plurality of holes 17, in the bars 15, the bars can be readily adjusted to give the arms different positions.

In Fig. 4 I have shown still another method of adjusting the arms, which consists in pivoting the arms 18 at the back of the shovel and having them extend along the sides thereof. In this case the arms are adjusted by having a plurality of holes 19 through which bolts 20 may be passed to engage with the arms 18.

Having thus described my invention, what I claim and desire to secure by Letters Patent is:

1. The combination with a digging shovel, of suitable arms, a guide-shoe extending across the outer ends of said arms, and turn-buckles connecting between said arms and said shovel for adjusting the position of said arms.

2. The combination with a shovel, of arms pivoted adjacent to the digging edge thereof, a guide-shoe at the outer ends of said arms, and means for adjusting the position of said arms relative to said shovel and holding them rigidly in such position.

3. The combination with a shovel, of bars or the like secured to said shovel for drawing the same, a plate connecting between said bars to form a suitable guide-shoe, and means for adjusting the position of said arms with respect to the shovel.

4. The combination with a shovel, of arms pivotally secured to the sides of said shovel, and adjustable means connecting between said arms and the sides of said shovel for adjusting the position of said arms and for holding said arms rigidly in such adjusted position with respect to the shovel.

WILLIAM J. NEWMAN.

Witnesses:
A. W. FENSTEMAKER,
C. H. CRAWFORD.